United States Patent
Basol (10) Patent No.: US 7,250,103 B2
(45) Date of Patent: Jul. 31, 2007

(54) METHOD AND APPARATUS FOR ELIMINATING DEFECTS AND IMPROVING UNIFORMITY IN ELECTROCHEMICALLY PROCESSED CONDUCTIVE LAYERS

(75) Inventor: Bulent M. Basol, Manhattan Beach, CA (US)

(73) Assignee: Novellus Systems, Inc., San Jose, CA (US)

( * ) Notice: Subject to any disclaimer, the term of this patent is extended or adjusted under 35 U.S.C. 154(b) by 297 days.

(21) Appl. No.: 10/638,751

(22) Filed: Aug. 11, 2003

(65) Prior Publication Data
US 2004/0200732 A1   Oct. 14, 2004

Related U.S. Application Data

(60) Provisional application No. 60/462,916, filed on Apr. 14, 2003.

(51) Int. Cl.
*C25F 3/02* (2006.01)
*B23H 5/06* (2006.01)
*C25F 3/12* (2006.01)

(52) U.S. Cl. .................. 205/647; 205/646; 205/662; 205/663

(58) Field of Classification Search .................. None
See application file for complete search history.

(56) References Cited

U.S. PATENT DOCUMENTS

| | | | |
|---|---|---|---|
| 5,114,548 A * | 5/1992 | Rhoades | 205/662 |
| 6,143,155 A | 11/2000 | Adams et al. | |
| 6,315,883 B1 | 11/2001 | Mayer et al. | |
| 6,328,872 B1 * | 12/2001 | Talieh et al. | 205/206 |
| 6,395,152 B1 | 5/2002 | Wang | |
| 6,440,295 B1 | 8/2002 | Wang | |
| 6,811,680 B2 * | 11/2004 | Chen et al. | 205/662 |
| 2003/0168351 A1 * | 9/2003 | Basol | 205/671 |

* cited by examiner

*Primary Examiner*—Harry D. Wilkins, III
(74) *Attorney, Agent, or Firm*—Knobbe Martens Olson & Bear LLP (57) ABSTRACT

A method of removing material from a conductive surface of a workpiece while the conductive surface and an electrode are wetted by a process solution. The method comprises the steps of applying power between the conductive surface and the electrode, rendering the conductive surface anodic. The method includes the step of allowing a passivation layer to build up on the conductive surface/The method includes the step of applying an external influence to the conductive surface to periodically reduce the passivation layer thickness. Advantages of the invention include an efficient technique for electropolishing a workpiece.

33 Claims, 10 Drawing Sheets

METHOD AND APPARATUS FOR ELIMINATING DEFECTS AND IMPROVING UNIFORMITY IN ELECTROCHEMICALLY PROCESSED CONDUCTIVE LAYERS

RELATED APPLICATIONS

This application claims priority from U.S. Provisional Application Ser. No. 60/462,916 filed Apr. 14, 2003, which is expressly incorporated by reference herein.

FIELD

The present invention relates to manufacture of semiconductor integrated circuits and, more particularly to a method for electropolishing of conductive layers.

BACKGROUND

Conventional semiconductor devices generally include a semiconductor substrate, usually a silicon substrate, and a plurality of sequentially formed dielectric interlayers such as silicon dioxide and conductive paths or interconnects made of conductive materials. Copper and copper alloys have recently received considerable attention as interconnect materials because of their superior electromigration and low resistivity characteristics. The interconnects are usually formed by filling copper by a deposition process in features or cavities etched into the dielectric interlayers. The preferred method of copper deposition process is electroplating. In an integrated circuit, multiple levels of interconnect networks laterally extend with respect to the substrate surface. Interconnects formed in sequential interlayers can be electrically connected using vias or contacts.

In a typical interconnect fabrication process; first an insulating dielectric interlayer is formed on the semiconductor substrate. Patterning and etching processes are performed to form features such as trenches and vias in the insulating layer. Then, copper is electroplated to fill all the features. However, the plating process results in a thick copper layer on the substrate some of which needs to be removed before the subsequent step. Conventionally, after the copper plating, CMP process is employed to planarize and then reduce the thickness of this overburden or excess copper layer down to the level of the surface of the barrier or insulation layer. In summary, CMP is used to remove all of the conductors from the surface so that copper-filled features at an interconnect layer are electrically isolated from one another. However, CMP process is a costly and time-consuming process that reduces production efficiency. Furthermore, although CMP can be used with the conventional interlayer dielectrics, it may create problems with low-k dielectrics because of the mechanical force applied on the wafer surface during the CMP process. During the CMP step, ultra low-k or low-k materials may be stressed and may delaminate or other defects may form due to the low mechanical strength of the low-k materials.

Another material removal technique employed for excess copper polishing involves well-known electropolishing processes. In electropolishing, both the material to be removed and a conductive electrode are dipped into the process solution, which may be an electropolishing solution. Typically an anodic (positive) voltage is applied to the material to be removed with respect to the conductive electrode. With the applied voltage, the material is electrochemically dissolved and removed from the wafer surface.

Figure 1:
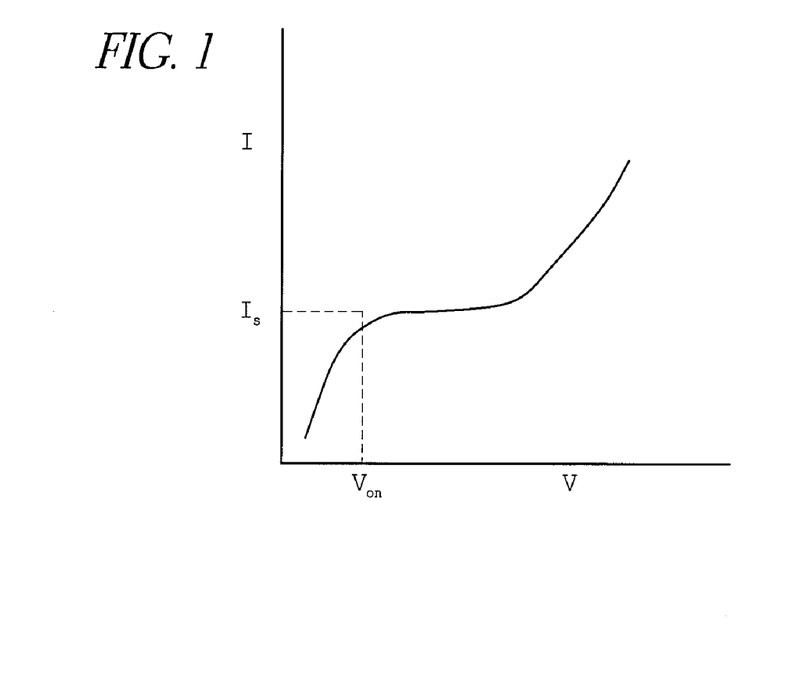
FIG. 1 is a schematic illustration of current-voltage diagram used for a typical electropolishing process.

Electropolishing of copper layers has been studied in the literature and the mechanisms of polishing of the film surfaces have been investigated (see for example, R. Vidal and A. West "Copper electropolishing in concentrated phosphoric acid", J. Electrochemical Society, vol: 142, p:2682, 1995; Shih-Chieh Chang et al. "Micro leveling mechanisms and applications of electropolishing on planarization of copper metallization", J. Vacuum Science and Technology, B(20), p:2149, 2002). In a typical electropolishing process, the anodic polarization curve looks like the one shown in FIG. 1. As the positive potential applied to the anode (in this example, a substrate such as a wafer with a copper surface film to be electrochemically removed) is increased with respect to an electrode (cathode) placed in the electropolishing solution, the current first increases in a near-linear manner. During this time electrochemical etching starts removing copper from the copper layer. At a potential $V_{on}$, rate of increase in current gets reduced and the current value saturates at approximately $I_s$. This current saturation region, which is also called limited current density region, is the region when a salt layer, a passivation layer or a boundary layer is formed on the copper surface. This passivation layer has high resistance; it is rich in copper ions and it acts as a diffusion barrier slowing down material removal rate from the surface. As the voltage is further increased beyond the current saturation region, the electropolishing current starts to rise up sharply due to gas-evolution reaction. Electropolishing and smoothing of the surface of the copper layer takes place at or above the current plateau, which is approximately represented by the value $I_s$ in our example. It should be noted that the value of voltage and current where the boundary layer forms is a function of various process parameters such as the composition and temperature of the electrolyte, and the amount of stirring or disturbance on the surface of the anode. For example, in commonly used copper electropolishing electrolytes containing phosphoric acid and glycerol, as the acid content is reduced, the value of $I_s$ goes down and the value of $V_{on}$ increases. If electropolishing is carried out on a copper coated wafer held by a rotating wafer holder, the value of $I_s$ increases as the rotation (rpm) of the wafer increases. Similarly, increased electrolyte temperature causes an increase in the $I_s$ value and a decrease in the voltage. The reason for these trends is the fact that higher temperatures and increased agitation at the copper surface decreases the equilibrium thickness of the barrier layer, if all other variables are kept the same.

Figure 2:
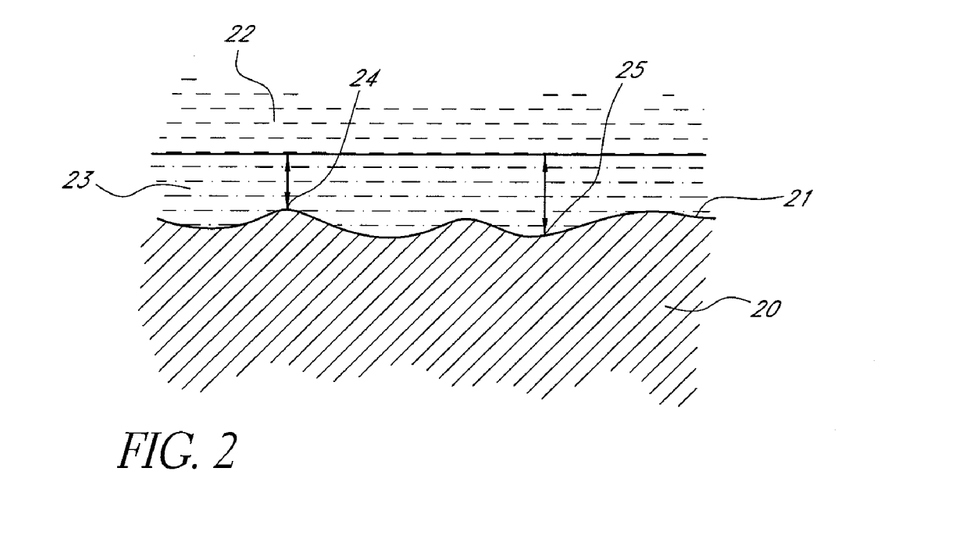
FIG. 2 a schematic illustration of formation of passivation layer during a typical electropolishing process.

FIG. 2 illustrates a commonly accepted mechanism for electropolishing a copper film, which is also applicable to electropolishing of many other metals such as stainless steel, Ni, Ta, W etc. In FIG. 2, the exemplary copper layer 20 has a rough surface 21. When this copper layer is placed into an electropolishing solution 22 and a high enough anodic potential (a potential higher than $V_{on}$ in FIG. 1) is applied to it with respect to a counter electrode (not shown) placed in the same solution 22, a passivation layer 23 forms on the surface as explained before. This passivation layer has an effective thickness, which is smaller over protruded regions 24 compared to recessed regions 25 on the surface of the copper layer 20 as shown by arrows in FIG. 2. As a result, higher current density flows to the protruded areas and more material removal takes place in these regions where the thickness of the passivation layer is thinner. This way the surface is flattened and polished.

The simplified description of the mechanism of electropolishing given above is valid under ideal conditions. However, in actuality, the salt layer, or the passivation layer may not be as uniform as shown in FIG. 2. There may actually be defects in the salt layer. These defects may be in the form of discontinuities, voids or thin areas at various locations of the passivation layer. Reasons for such defects may include but are not limited to presence of particulate impurities in the electropolishing solution, presence of bubbles attached to the copper layer surface, and impurities on the copper layer surface that retards formation of a salt layer right above them. A defect in the passivation layer at a specific site on the copper layer surface may result in a reduction of the passivation layer thickness at that location. As described earlier, a thin passivation layer thickness at that specific point then causes more current flow and more copper removal from that site. Such preferential material removal from a specific location on the copper layer surface causes defect formation in the copper layer itself as will be described next with the help of FIGS. 3 to 5E.

Figure 3:
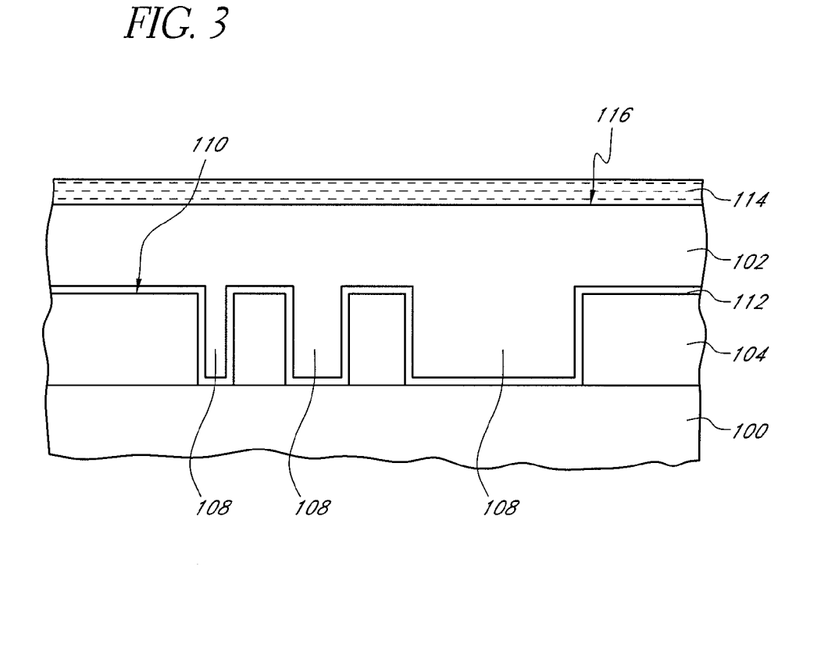
FIG. 3 is a schematic illustration of electropolishing of a semiconductor substrate with a conductive film on top it.

FIG. 3 illustrates a semiconductor substrate 100 including a copper film 102 that is being electropolished. The substrate 100 has a dielectric layer 104 having features 108 such as trenches. The features 108 and the top surface of the dielectric layer are coated with a barrier layer 112 and a copper seed layer (not shown) before the deposition of the copper layer 102. The top surface 110 of the dielectric layer will be referred to as field surface hereinafter. As shown in FIG. 3, a passivation layer 114 forms on top surface 116 of the copper layer 102 when electropolishing is initiated. If there is no defect in the passivation layer 114, copper removal can continue until all copper is removed approximately down to the top surface 110. The barrier 112 is then removed either by CMP, reactive ion etching or electropolishing to leave conducting materials only in the features 108. However, any defects formed during the electropolishing process may over-etch copper in certain locations, and if these locations are right above the features 108, copper may be removed from within the features by the time it is removed from the field region. This is not acceptable. Good quality interconnects require features that are completely filled with defect-free copper.

Figure 4A:
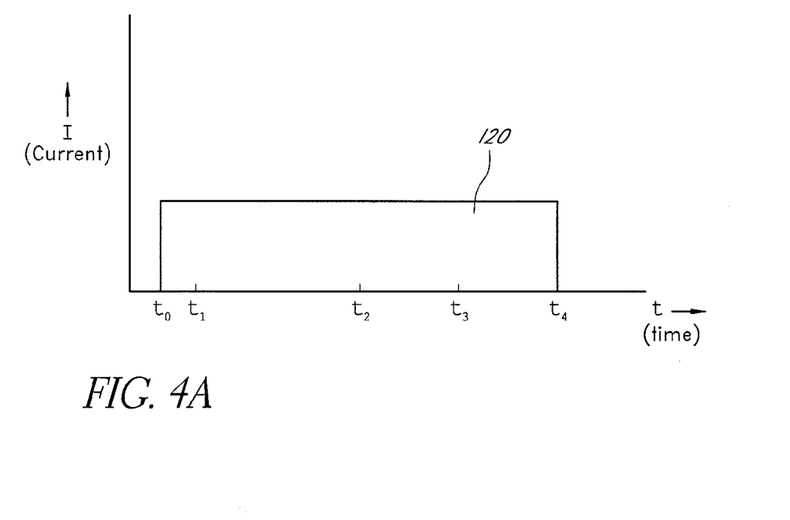
FIG. 4A is a time-current graph depicting a current profile applied during a conventional electropolishing process.

Time-current graph illustrated in FIG. 4A shows a standard current profile applied to the substrate during a typical electropolishing process. This is a current-controlled mode of power application. It is also possible to apply power under voltage controlled mode, i.e. the waveform in FIG. 4A may be voltage rather than current. FIGS. 5A-5E illustrate a portion of the copper plated substrate during the exemplary time periods between $t_0$ through $t_4$, which are also indicated in graph 120 in FIG. 4A. FIGS. 5A-5E illustrate one possible mechanism of formation of a defect in copper layer due to a defect in the passivation layer.

Figures 5A, 5B:
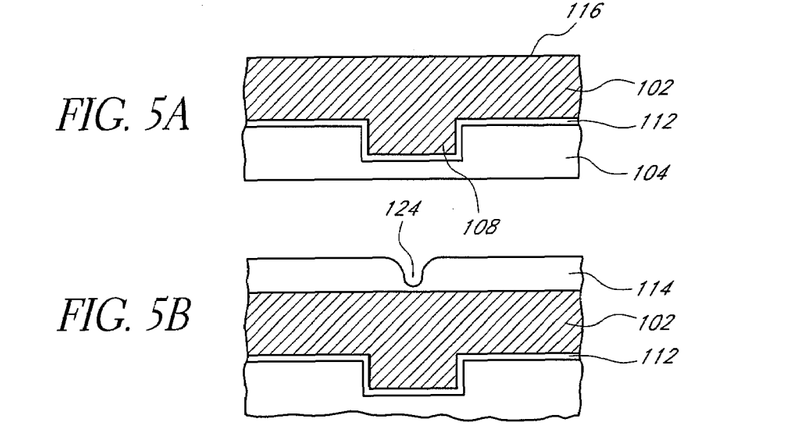
FIGS. 5A-5E illustrate a mechanism of formation of a defect in a copper layer due to a defect in the passivation layer during an electropolishing process.
Figure 5C:
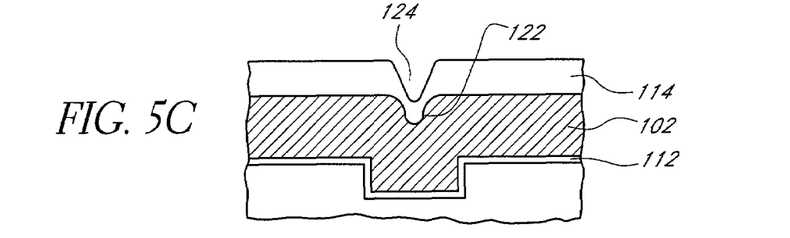

FIG. 5A shows a portion of the copper layer 102 with a top surface 116. The copper layer of this example is to be electropolished and removed all the way to the level of the barrier 112, leaving copper only in the feature 108. FIG. 5A shows the copper layer in the electropolishing solution at time to when the process is first initiated. As shown in FIG. 5B, by the time $t_1$ a passivation layer 114 formed over the copper layer surface. However, unlike the ideal situation depicted in FIG. 2, the passivation layer 114 has a defect 124 in it. The defect 124 renders the passivation layer 114 thinner at that specific location. The dimple or defect 124 in the passivation layer causes more electropolishing current to pass through that location. As shown in FIG. 5C, which depicts the situation at a later time $t_2$, higher current density causes over etching of copper at this location and an over-etched region 122 forms in the top surface of the copper layer 102. This overetching continues as long as the electropolishing current is passed through the copper.

Figure 5D:
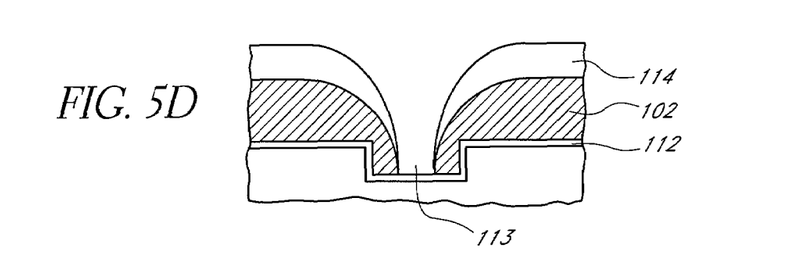
Figure 5E:
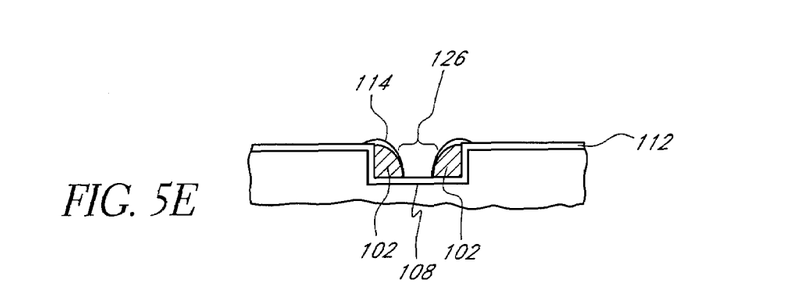

The overetching at the defect location may be accelerated further due to the fact that high current density may cause local heating of the electropolishing solution in the vicinity of the defect, rendering the passivation layer thickness even lower in this location due to increased local temperature. Therefore the over-etched region 122 expands faster into the copper layer 102 towards the barrier layer 112 as can be seen in FIG. 5D, which exemplifies the situation at a time $t_3$. As can be seen from FIG. 5D, the copper in the feature 108 is partially etched by this time, although copper over the field areas have not yet been totally cleared. Once the barrier layer 112 is exposed in area 113, the passivation layer over the barrier layer gets thin or discontinuous as shown in FIG. 5D, because there is no copper ions fed into the passivation layer right above the barrier layer to sustain it. Without the protection of the thick passivation layer 114, as shown in FIG. 5E, electroetching of the copper layer at this location quickly progresses until the exemplary time $t_4$ and forms a large copper loss 126 in the copper layer 102 within the feature 108. Obviously, this is not an acceptable result.

Figure 4B:
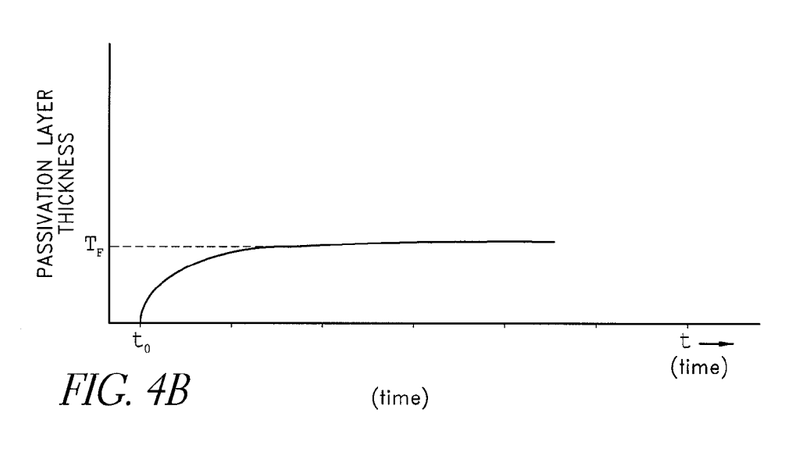
FIG. 4B is a time-passivation layer thickness graph depicting passivation layer thickness change during a conventional electropolishing process.

Curve 140 in FIG. 4B also exemplifies formation of a passivation layer, as the current profile 120 shown in FIG. 4A is applied to a substrate having copper layer on it. As shown in FIG. 4B, thickness of the passivation layer increases and may reach a thickness $T_F$ and then grow very slowly, if any. During this slow growth regime small changes (such as solution flow, temperature, velocity, defects etc) in process environment can give rise to non-uniformities in the passivation layer as discussed before and as it will be described below. The same graph 140 can also be used to interpret material removal rate during the electropolishing process. In this respect, highest material removal is aftertime to and as the thickness of the passivation layer increases, material removal rate reaches its minimum level at a given applied power.

The example given above discussed one possible way how microscopic defects may form during prior art electropolishing approaches. There are other problems associated with standard electropolishing. For example, during electropolishing, substrates such as wafers are usually moved. This movement is usually in the form of rotation. As can be appreciated, the linear velocity on a rotating substrate such as a wafer is not uniform and it increases from zero at the center to a maximum value at it radius. As discussed previously, the thickness of the salt layer forming on a wafer that is being electropolished, is a function of the amount of stirring or mechanical disturbance at the wafer/solution interface. Higher solution flows or enhanced motion of the wafer surface reduce the thickness of the salt layer and increase removal rate at that location.

Figure 6:
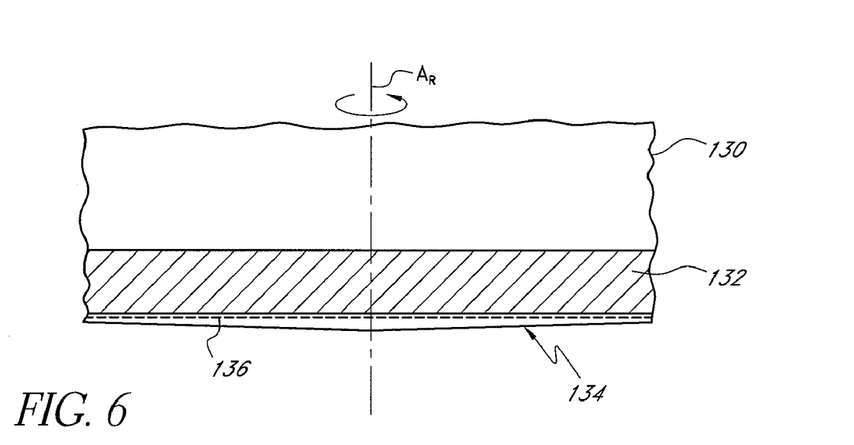
FIG. 6 illustrates variation of passivation layer thickness on wafer surface during a conventional electropolishing process.

Since the linear velocity on a wafer surface is not constant, when a constant waveform such as the one depicted in FIG. 4A is employed, the thickness of the salt layer is expected to grow faster at the center of the rotating wafer compared to the edge due to the lower velocity near the center. This situation can be exemplified in FIG. 6, which illustrates a central portion of a substrate 130 having a copper layer 132 on which a passivation layer 134 is formed. As is seen, thickness of the passivation layer 134 is thickest about the rotation axis $A_R$ of the substrate 130 but the thickness of the layer is gradually reduced towards the edge of the substrate. Referring to FIGS. 4A and 6 now, the dotted line 136 shows the thickness profile of the passivation layer at time $t_1$, which is near-flat during this short time period. However, as the time passes, the thickness of the passivation layer grows faster at the center than the edges and the passivation layer 134 with center thick profile is formed by time $t_4$. This thick center gives rise to macroscopic non-uniformity (or within wafer non-uniformity) in the removal rate, removal rate being lower near the center.

Therefore, it is necessary to develop process approaches and systems that can uniformly and repeatably electropolish conductive layers without overetched regions and defects resulting from them.

SUMMARY

The invention overcomes the identified limitations and provides a technique for efficiently electropolishing conductive layers of a semiconductor workpiece.

A method is described for removing material from a conductive surface of a workpiece while the conductive surface and an electrode are wetted by a process solution. The method comprises the steps of applying power between the conductive surface and the electrode, rendering the conductive surface anodic. The method includes the step of allowing a passivation layer to build up on the conductive surface. The method includes the step of applying an external influence to the conductive surface to periodically reduce the passivation layer thickness.

In one aspect of the invention, the current or voltage, i.e. power, is varied. In another aspect of the invention, the external influence is a mechanical sweeper. In another aspect of the invention, the current or voltage, i.e. power, is varied and the external influence is a mechanical sweeper. Other aspects are described below.

Advantages of the invention include an efficient technique for electropolishing a workpiece.

DETAILED DESCRIPTION

In an embodiment of the present invention, a conductive layer on a substrate, such as a semiconductor wafer is first electropolished for a predetermined time period so that a passivation layer is at least partially formed on the conductive layer. At the end of the predetermined time period the electropolishing is stopped and the passivation layer is destroyed or wiped off the surface of the conductive layer. The process is continued by repeating these steps multiple times. In one embodiment, destruction of the passivation layer may be performed using an external mechanical influence on the conductor surface to remove the passivation layer. In another embodiment the passivation layer is removed by changing the motion of the substrate such as by rotating or spinning at high revolutions per minute and/or moving the substrate laterally with or without the application of the mechanical influence. Spinning of the substrate can be performed in the electropolishing solution or outside the solution by pulling out the substrate out of the solution and spinning. In another embodiment, the electropolishing is stopped for a predetermined time so that the passivation layer dissipates in the electropolishing solution. In another embodiment, substrate can be simply pulled out of the electropolishing solution to remove the passivation layer.

Figure 7:
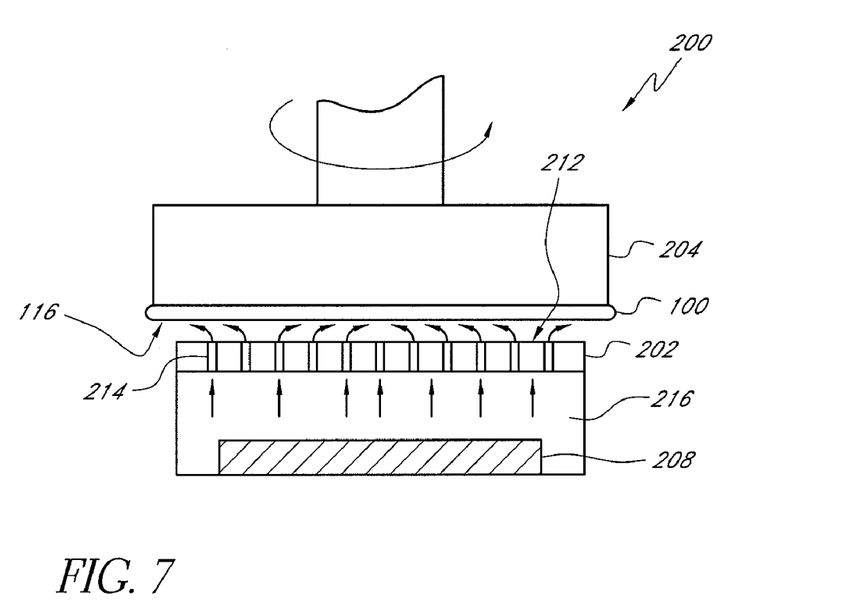
FIG. 7 illustrates an exemplary electropolishing or electrochemical mechanical polishing system of the present invention.

FIG. 7 shows an exemplary electrochemical mechanical processing (ECMPR) system 200 that can be used to practice the electrochemical polishing or electrochemical mechanical polishing process of the present invention. The ECMPR system includes a workpiece-surface-influencing device (WSID) 202 such as a mask, pad or a sweeper, a carrier head 204 holding a workpiece 100 such as a substrate or wafer, and an electrode 208. The wafer 100 is described in connection with FIG. 3. The WSID 202 preferably contains a pad material on its top surface 212 facing the wafer surface 116. It is with this pad material that the wafer surface is swept during the predetermined times when electropolishing is stopped. Electropolishing is initiated by applying an electrical potential between an electrode (cathode) 208 and the surface 116 of the wafer 100. Electrical contact to the wafer surface 116 may be made using conductive brushes contacting the perimeter of the wafer while the wafer is moved or rotated. Such electrical contacts are described in U.S. patent application Ser. No. 10/282,930 entitled Method and System to Provide Electrical Contacts for Electrotreating Processes filed Oct. 28, 2002, which is owned assignee of the present application. Alternately, other types of contacts may be used including contacts embedded in the WSID structure.

Channels 214 of the WSID allow a process solution 216 such as a phosphoric acid solution to flow to the surface of the wafer 116. It should be noted that although a full WSID is depicted in FIG. 7, a small WSID consisting of a single pad strip may also be utilized to practice the present invention. Further, the geometry of the system may be changed to a vertical one where the substrate, WSID and other components are not horizontal but they are vertical. Alternately, the system of FIG. 7 may be rotated 180 degrees.

Figure 8A:
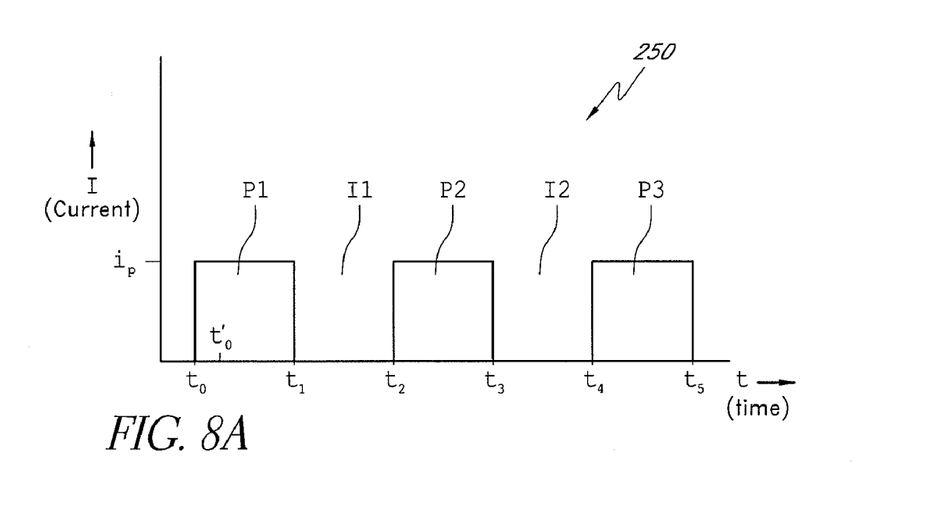
FIG. 8A is a time-current graph depicting a current profile applied during an embodiment of the electropolishing process of the present invention.

The current-time graph 250 in FIG. 8A illustrates the process sequence of the present invention with a current-time graph. Accordingly, in this example, electrochemical material removal such as the removal of copper from the surface of wafer 100 of FIG. 7, is achieved during period $P_1$ (between time $t_0$ and $t_1$), $P_2$ (between time $t_2$ and $t_3$) and $P_3$ (between time $t_4$ and $t_5$). The system 200 may be used for this purpose as well as any other electropolishing system with the means necessary to substantially remove the passivation layer when needed. As described before, when the process is initiated at time $t_0$ (see FIG. 8A) by applying a process current such as $i_p$, a passivation layer starts to form on the surface of the exemplary copper layer. During intervals $I_1$ (between time $t_1$, and $t_2$) and $I_2$ (between time $t_3$ and $t_4$), however, the electropolishing process is stopped and the passivation layer is at least partially removed.

The removal of the passivation layer may preferably be performed by touching or sweeping the surface of the copper surface with the WSID 202 of the system 200. As the WSID touches the surface 116, a relative motion is maintained between the surface 116 of the wafer and the surface of the WSID, thus the passivation layer is swept off the surface 116. As mentioned above, passivation layer removal can be performed by spinning the wafer 100 in the process solution (wet spinning) or outside the solution (dry spinning). In the wet spinning case, the wafer is spun at high rpm in the process solution to remove the passivation layer. During the wet spinning, the plating current may be on or off and the wafer may be oscillated in horizontal directions in addition to rotation. This makes sure that the passivation layer right at the center of the wafer where velocity due to rotation is low gets exposed to higher velocity due to lateral motion. In the dry spinning case, the wafer 100 is taken out of the process solution by moving the carrier head upwardly and is spun to remove the solution together with the passivation layer.

Alternatively, each period $P_1$, $P_2$ or $P_3$ may be divided into internal periods and internal intervals. For example, for period $P_1$, between the time $t_0$ and $t_1$, the process current $i_p$ may be applied multiple times and provided that each current application separated from the next one with an interval to at least partially remove the passivation layer. Similarly, in each interval $I_1$, $I_2$ or $I_3$, the removal of the passivation layer may be performed within only a fraction of the duration of the interval. As will be described more fully below, in other embodiments, the passivation layer may be destroyed or at least partially removed by moving the wafer at high speeds both rotationally and laterally during the intervals $I_1$, $I_2$ etc. Further, passivation layer removal may be performed by simply taking longer intervals $I_1$, $I_2$ etc., to let the passivation layer dissipate in the electropolishing solution. This approach, however, reduces the throughput of the process.

It should be noted that the waveform given in FIG. 8A suggests application of power under current-controlled mode. Alternately, power may also be applied under voltage-controlled mode, in which case the waveform in FIG. 8A would be a voltage-time graph. It is also possible to switch between current-controlled and voltage-controlled modes during the process.

Figure 8B:
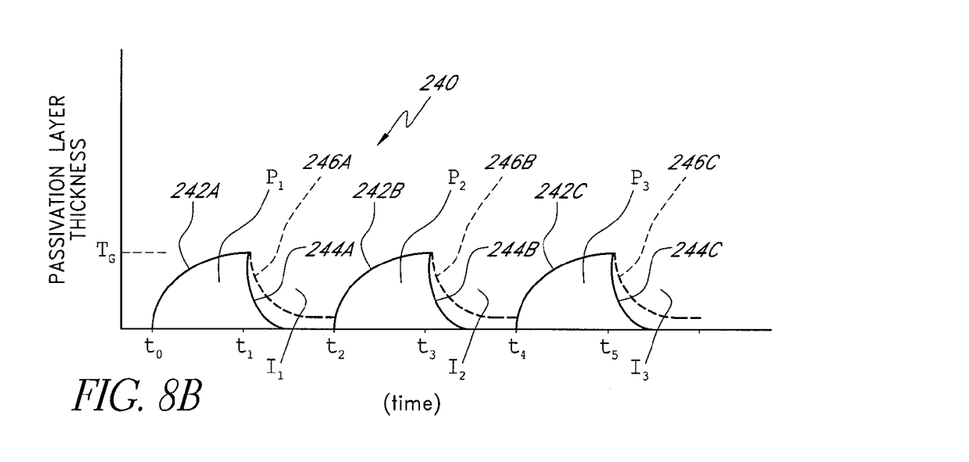
FIG. 8B is a time-passivation layer thickness graph depicting passivation layer thickness change during the electropolishing process of an embodiment of the present invention.

Graph 240 in FIG. 8B exemplifies formation and removal of a passivation layer, as the current profile 250 in FIG. 8A is applied during the process. As shown in FIG. 8B with curves 242A, 242B and 242C, during the periods $P_1$, $P_2$, $P_3$, the thickness of the passivation layer increases and reaches a level ($T_G$) at period ending times (interval start times) $t_1$, $t_2$ and $t_5$. As shown with curves 244A, 244B and 244C, during intervals $I_1$, $I_2$ and $I_3$ thickness of the passivation layer is drastically reduced until the next period starts. This thickness reduction may be controlled with the external influence used during the intervals, such as spinning, sweeping, temperature change, solution flow increase, etc. By controlling the application intensity of the external influence, passivation layer removal may be more as shown by curves 244A-244C or less as shown by curves 246A-246C. The thickness of the passivation layer is cyclic in FIG. 8B and it is very repeatable. Therefore, removal rate during each period is also very repeatable.

Figure 9:
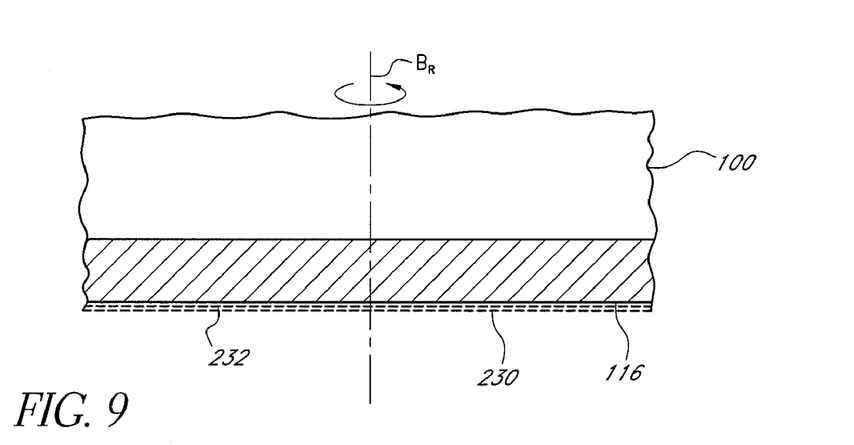
FIG. 9 illustrates uniformity of the passivation layer thickness during electropolishing process of the present invention.

FIG. 9 exemplifies a central portion of the wafer 100 with passivation layer 230 formed on the conductive surface 116 for example in period $P_1$, between time $t_0$ and $t_1$ as the wafer is rotated about the rotation axis $B_R$. During the process, an initial flat passivation layer 232 may form by time $t_0'$. Between time $t_0'$ and $t_1$, the thin layer grows some more forming passivation layer 230, which is still rather flat. It should be noted that, the passivation layer is not allowed to grow any further and become nonuniform like in FIG. 6, because during period $I_1$, it is disturbed and as a result either reduced in thickness or removed totally.

As opposed to prior art, the present invention stops fast defect propagation through the copper layer as electropolishing continues. It also gives more repeatable passivation layer thickness everywhere on the wafer, therefore reducing non-uniformity of the removal rate. Advantageous aspects of the present invention will now be described by referring to FIG. 10A through 10G.

Figure 10A:
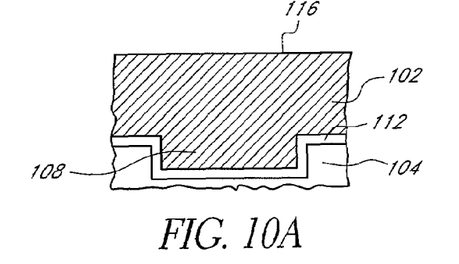
FIGS. 10A-10G illustrate mechanism of electropolishing a copper layer during an electropolishing process of the present invention.
Figure 10B:
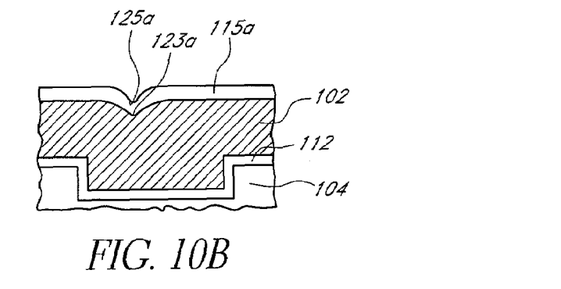
Figure 10C:
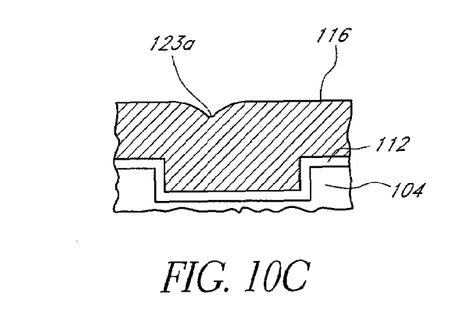

FIG. 10A represents the substrate 104 with a feature 108. A copper layer 102 is formed on the substrate surface after deposition of a barrier layer 112. The surface 116 of the copper layer 102 is to be electrochemically etched and the copper layer 102 is to be removed, leaving copper only in the feature 108. When the electropolishing current, $i_p$, is initiated at time $t_0$ as shown in FIG. 8A, a passivation layer starts to form on the surface 116 as described before. During the material removal period $P_1$, copper is removed from the surface. If there is a defect 125a in the passivation layer 115a, this defect causes overetching at that location and gives rise to a dimple 123a in the copper layer by the time $t_1$ as shown in FIG. 10B. If the electropolishing current was kept on as in FIG. 4A, this dimple on the copper surface would have grown in time and given rise to a large defect in the feature 108 as described in FIGS. 5A through 5E for the prior art. However, without giving a chance to the dimple 123a to grow in an accelerated manner, the electropolishing current is cut-off at time $t_1$ and passivation layer removal interval $I_1$ is initiated. FIG. 10C shows the situation at the end of the interval $I_1$, at time $t_2$. As can be seen from FIG. 10C, during interval $I_1$, the passivation layer 115a is removed.

One preferred method of removing the passivation layer is by physically sweeping the surface 116 with WSID in the system 200. For example, during the period $P_1$ the wafer surface is above the top surface of WSID and electropolishing and therefore electrochemical removal of copper is achieved in a uniform manner. During this material removal step the wafer may be rotated and laterally translated. For example, the rotation may be in the range of 1-10 rpm and the speed of lateral translation may be in the range of 0-10 mm/sec in an electropolishing solution consisting of three parts of phosphoric acid and two parts of glycerol at a temperature of 50° C. These rpm and lateral velocity values may change depending upon the chemistry and solution temperature as long as the values used are able to sustain the formation of a passivation layer on the substrate surface. During the passivation layer removal interval, the electropolishing current is cut off and the wafer may be lowered so that its surface is physically swept by the top surface of the WSID. During the intervals, speeds of lateral translation and rpm may be changed for most efficient sweeping. Typically, for the electrolyte composition given above, the period $P_1$ may be in the range of 3-10 seconds and the interval $I_1$ may be in the range of 2-5 seconds. An alternate way of removing the passivation layer during the interval $I_1$ is increasing the rpm and the translation speed of the wafer. In this case, physical contact with the WSID is not necessary. The rpm is increased, for example to a range of 50-200 and the translation speed is increased to a range of 20-100 mm/sec. As mentioned before higher rpm or higher relative motion between the copper surface and the electropolishing solution, reduces the thickness of the passivation layer if there is electropolishing current flowing. If there is no current flowing such high relative motion provides fast dissipation of the passivation layer from the wafer surface. Since the velocity of the central region of a rotating wafer is very low, addition of a high lateral translation speed to wafer rotation helps dissipate the passivation layer even right at the center of the wafer. Of course, the two approaches described above may also be used together to remove the passivation layer.

As can be appreciated, many different WSID designs and surface sweeping approaches may be used to practice this invention. Furthermore, although electropolishing current is totally cut off during the passivation layer removal steps in FIG. 8A, it should be understood that the current may just be reduced to a relatively low level, close to zero current or to a slightly negative current level so that it cannot sustain a passivation layer. It is even possible to keep the current constant, as shown in FIG. 4A, and just to apply the passivation layer removal techniques during intervals $I_1$, $I_2$ etc. In this case, a WSID can sweep the surface of the wafer during these periods to remove the passivation layer, or high rpm can be used at intervals to achieve a similar result. However, since the passing current would try to repair the passivation layer, sweeping would have to be more rigorous (higher pressure and higher relative motion between the WSID and the wafer surface) or higher rpm needs to be employed to overcome the passivation layer repairing action of the flowing current.

Figure 10D:
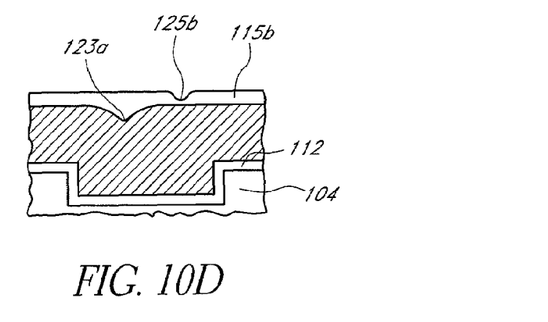
Figure 10E:
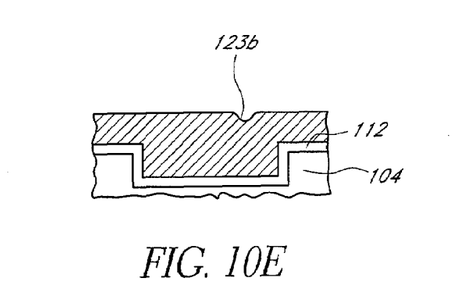
Figure 10F:
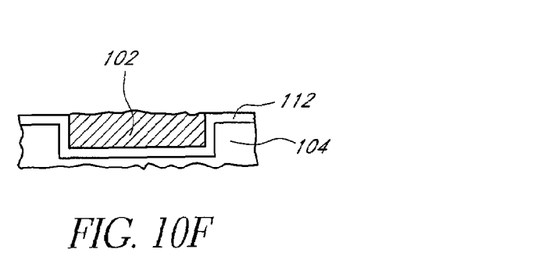

Referring back to FIG. 10C, which shows the situation immediately before time $t_2$, it can be seen that stopping the material removal from the copper surface and wiping off the passivation layer leaves the surface with the small dimple 123a which did not have a chance to grow. Now, at time $t_2$, another pulse of current is applied to the electropolishing circuit and a new passivation layer 115b is grown on the copper surface in a short interval following $t_2$ (see FIG. 10D). For this new passivation layer 115b to have a defect right above the small dimple 123a on the copper surface is not very probable. It may, however, have another defect 125b at another location as shown in FIG. 10D. As electropolishing continues during period P2 until time $t_3$, the defect 125b in the new passivation layer 115b may cause overetching and a second small dimple 123b at the new location. However, during the same period the first dimple is expected to be flattened and polished by the electropolishing process as explained in relation to FIG. 2. FIG. 10E shows the situation at the end of interval $I_2$ after the new passivation layer 115b is removed. Referring to FIG. 10E, there is now a new small dimple 123b at the new location on the copper layer corresponding to the location of the defect 125b. The process is then continued during period $P_3$ and defect-free removal of the copper is achieved as shown in FIG. 10F. It should be understood that the defects shown in the passivation layer are for demonstrating advantageous aspects of the present invention in removing defects and achieving uniform electroetching. However, the process of the present invention can progress without any defect in passivation layer and achieves uniform electroetching of the conductive layer, as shown in FIG. 10F.

Figure 10G:
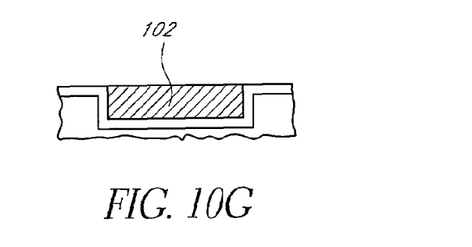

A suitable endpoint technique may be used to cut off the polishing current and end the process when the result shown in FIG. 10F is achieved. It should be noted that the worst case that can happen in this approach is to have a small dimple in the feature, which may be due to the last electropolishing period. Such small defects would be easily removed when the barrier layer 112 is removed from the field regions to leave conductors only in the features. FIG. 10G shows the substrate after the removal of the barrier layer. The depth of such dimples can also be reduced by reducing the magnitude and especially the duration of the current pulses shown in FIG. 8A.

Figure 11A:
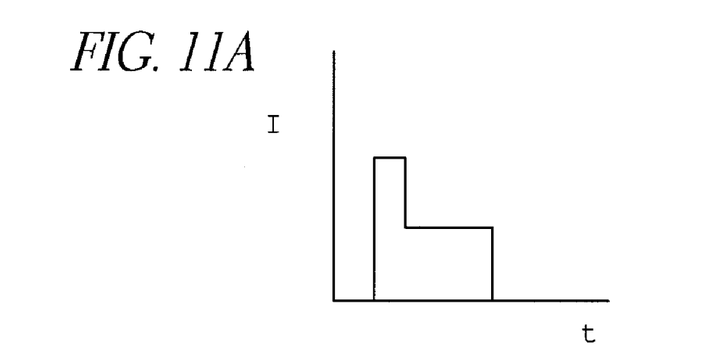
FIGS. 11A-11C illustrate graphs having various waveforms that can be used with the present invention.
Figure 11B:
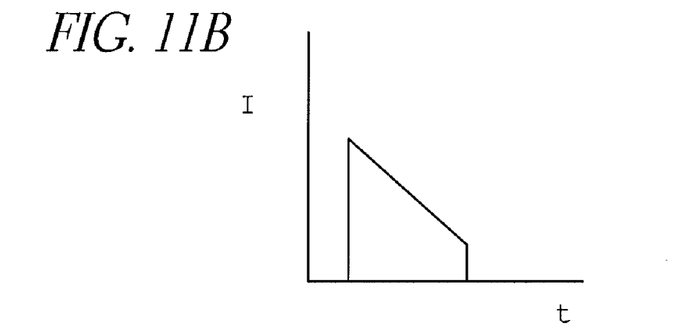
Figure 11C:
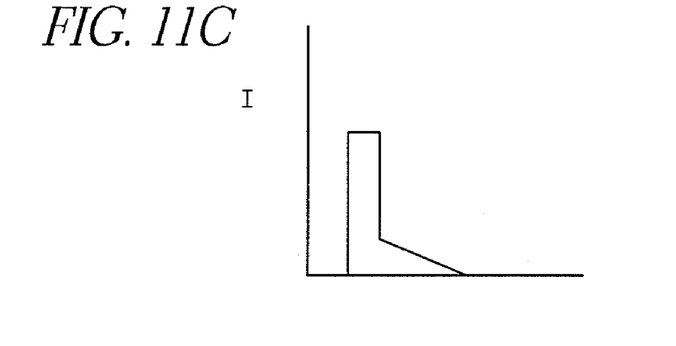

Although the above example uses current pulses in between passivation layer removal intervals $I_1$, $I_2$ etc., voltage pulses may also be used. Alternately, both current and voltage pulses may be used during the process. For example, the process may be started using current pulses and voltage pulses may be used towards the end of the process for end point. In this case when copper is cleared from certain areas, current density and thus removal automatically get reduced since voltage control is used for process power. It should also be noted that the pulses do not have to be square or rectangular. Some of the exemplary waveforms that can be used during periods $P_1$, $P_2$, $P_3$ etc are shown in FIGS. 11A, 11B and 11C. These waveforms may also be mixed during the process. Number of pulses and passivation layer removal interval needed in a given process depends on many factors such as the thickness of the conductor to be removed, duration of the pulses and the magnitude of the pulses. Waveforms that provide a high current early in the period, such as the ones shown in FIGS. 11A, 11B and 11C, are particularly suitable for practicing the present invention since this early high current establishes a passivation layer very quickly, for example during an initial period of up to about 2-3 seconds. The current or voltage waveforms applied under current-controlled or voltage-controlled modes may be referred to as "power" or "applied power" in general.

In another embodiment, the passivation layer may be destroyed or at least partially removed by moving the wafer at high speeds both rotationally and laterally during the intervals $I_1$, $I_2$ etc. In another embodiment, passivation layer removal may be performed by simply taking longer intervals $I_1$, $I_2$ etc., to let the passivation layer dissipate in the electropolishing solution. This approach, however, reduces the throughput of the process. What is preferable is to change at least one process parameter during the intervals $I_1$, $I_2$ etc. to help reduce the passivation layer thickness. As described above, an external influence such as physical contact by a WSID with the wafer surface, increase in wafer rpm, pulling the wafer out of the polishing solution are two distinct way of achieving this. Other ways include but are not limited to increasing the flow rate of the polishing solution during the periods when passivation layer thickness needs to be reduced and increasing the local temperature of the solution during these periods, i.e. pulsing the flow rate of the solution or the temperature. Electrolyte temperature can be increased using a heat source. In any case, the present invention, by systematically reducing the thickness of the passivation layer at intervals, and by growing a new passivation layer at other intervals, does not allow any non-uniformity in passivation layer thickness to grow. Otherwise, such non-uniformities would have grown in time and cause non-uniformities and defects on the wafer surface.

FIGS. 12A-13B describe various electrochemical material removal systems to perform the electrochemical polishing or electrochemical mechanical polishing methods of the present invention. In these embodiments, intervals occur when a pad or multiplicity of pads of a system touches the conductive surface of the wafer. As the pad touches the conductive surface, which is electropolished and having a passivation layer on it, the pad cleans the passivation layer. Cleaning time or the interval to clean the passivation layer from, for example, a reference location on the conductive surface depends on the width of the pad and the relative motion between the pad and the substrate surface. In the systems of the following embodiments, as the pad is moved away or the wafer is moved away, the reference location (that has just been cleaned) on the conductive surface is again exposed to the electropolishing solution. During this time of exposure, electropolishing occurs and the passivation layer is re-formed on the reference location. Electropolishing continues until the reference location is touched with the pad for the second time and cleaned. Process time between the first pad touch and the second pad touch to the reference location defines the electrochemical material removal periods described above (see FIG. 8A).

Figure 12A:
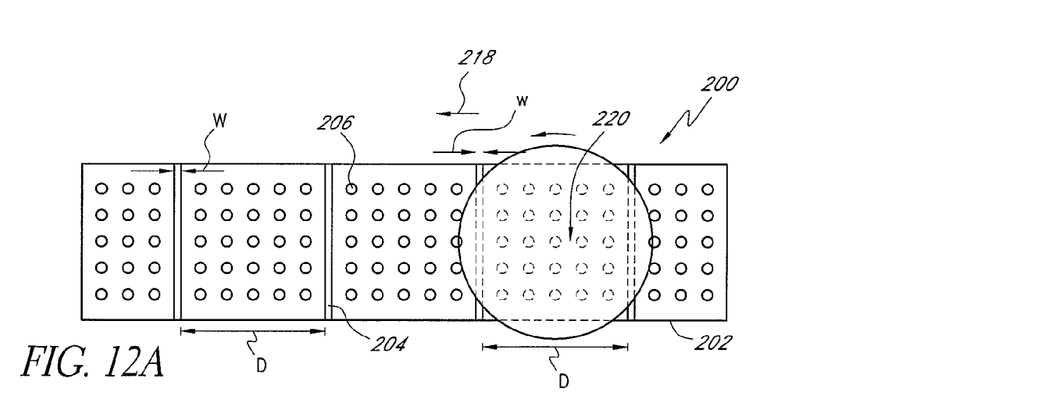
FIGS. 12A-12B illustrate an exemplary electropolishing system of the present invention.
Figure 12B:
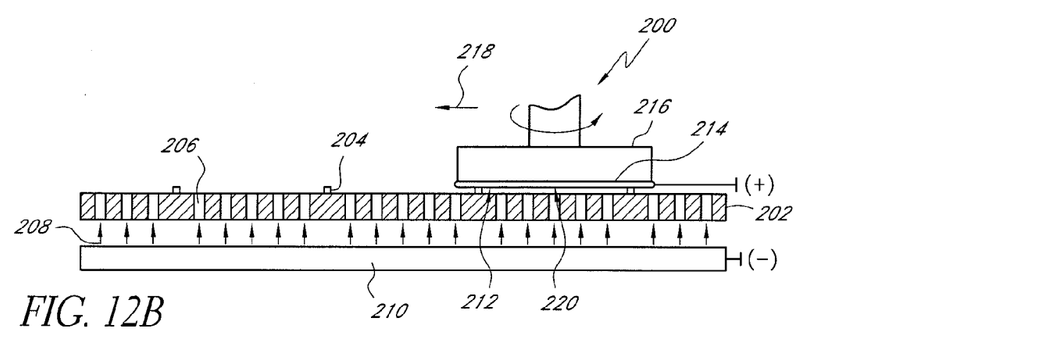

FIGS. 12A-12B illustrate an electrochemical material removal system 200 having a workpiece surface influencing device (WSID) 202 with pads 204 that are apart from one another with predetermined distances. Referring also to FIG. 8A, in this embodiment width 'W' of each pad 204 and the speed at which the wafer is moved across the pads defines the length of the intervals $I_1$, $I_2$, etc., and the distance 'D' between the pads and the speed of the wafer defines the length of the periods $P_1$, $P_2$, etc. Accordingly, as described above, by varying the width of the pads and the distance between them, cleaning times and the process times may be varied. As shown in plan view in FIG. 12A and in cross section in FIG. 12B, WSID 202 of the system 200 comprises openings 206 for an electropolishing solution 208 to flow through the WSID which is placed between an electrode 210 and a surface 212 of a wafer 214. Alternately, multiple electrodes may be embedded in WSID 202 upper surface facing the wafer. The wafer 214 is held by a wafer carrier 216 which can rote and move the wafer vertically an laterally. The surface includes a conductive layer such as copper layer. The system 200 also includes a power source to apply a potential difference between the electrode (cathode) and the surface (anode) of the wafer.

During the electrochemical polishing process, the wafer 214 is lowered and the surface 212 of the wafer touches the pads 204 while the wafer is rotated and moved laterally in a first direction 218. During the process, a reference area 220 on the surface 212 is exposed to electropolishing as it is moved along the 'D' distance between the pads. Consequently, the reference region is electropolished during this period. When reference area 220 reaches the pad, it is cleaned as it is touched by the pad 204. The process may continue on the WSID, as the wafer is moved in the first direction and then in the reverse direction.

Figure 13A:
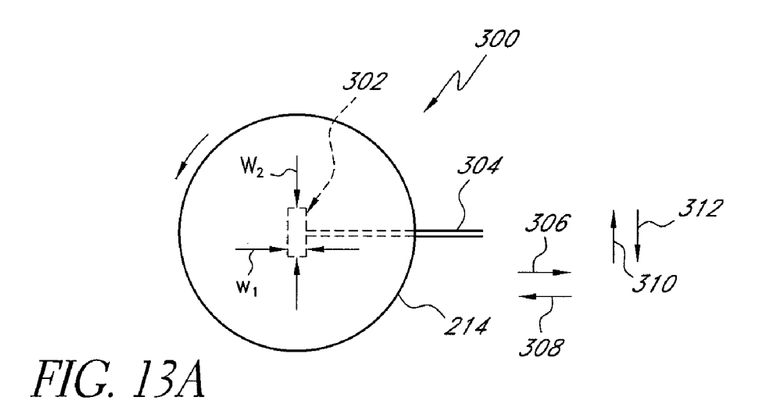
FIGS. 13A-13B illustrate an exemplary electropolishing system of the present invention.
Figure 13B:
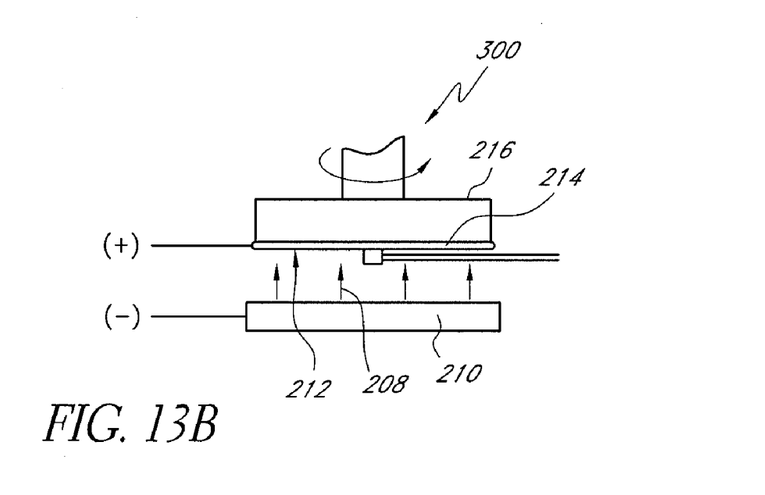

In the system 300 of FIGS. 13A-133B, the WSID of the system 200 is replaced with a pad 302 attached to a pad holder 304. During the process, the pad or the wafer is moved in the first or second direction 306, 308, or in the third or fourth directions 310, 312. The pad may have a first width $W_1$ and a second width $W_2$. The passivation layer at the location on the wafer surface where the pad physically contacts is cleaned off, while the rest of the surface is electropolished. The width of the pad and the speed that it is moved in the above directions determine the intervals $I_1$, $I_2$, etc., and the periods $P_1$, $P_2$, etc.

Although various preferred embodiments and the best mode have been described in detail above, those skilled in the art will readily appreciate that many modifications of the exemplary embodiment are possible without materially departing from the novel teachings and advantages of this invention.

The invention claimed is:

1. A method of removing material from a conductive surface of a workpiece while the conductive surface and an electrode are wetted by a process solution, the method comprising:
   applying power between the conductive surface and the electrode, rendering the conductive surface anodic;
   forming a passivation layer to a first thickness on the conductive surface by transforming a portion of the conductive surface while applying power; and
   applying an external influence to the conductive surface to periodically reduce the thickness of the passivation layer, wherein periodically reducing comprises reducing the thickness of the passivation layer from the first thickness to a second thickness after allowing the passivation layer to increase in thickness substantially to the first thickness, wherein the external influence does not contact the conductive surface while allowing the passivation layer to increase in thickness, and wherein the thickness is reduced more than once.

2. The method of claim 1, wherein the applying an external influence step includes physically sweeping the conductive surface.

3. The method of claim 1, wherein the applying an external influence step includes establishing a relative motion between the conductive surface and the solution.

4. The method of claim 3, wherein the relative motion during the applying an external influence step is higher than during the forming a passivation layer step.

5. The method of claim 1, wherein the applying an external influence step includes physically sweeping the conductive surface with a structure sufficiently large to reduce the local current density applied to a local region of the conductive surface under the structure.

6. The method of claim 1, wherein the applying power step includes varying the power between a maximum level and a minimum level.

7. The method of claim 6, wherein the applying an external influence step is performed when the power is in minimum level.

8. The method of claim 6, wherein the step of varying the power between a maximum level and a minimum level includes pulsing the power.

9. The method of claim 6, wherein the minimum power level comprises approximately zero voltage.

10. The method of claim 6, wherein the minimum power level comprises a negative voltage.

11. The method of claim 2, wherein the applying power step includes varying the power between a maximum level and a minimum level.

12. The method of claim 11, wherein the applying an external influence step is performed when the power is in minimum level.

13. The method of claim 1, wherein the applying an external influence step includes increasing local temperature of the process solution over the conductive surface.

14. The method of claim 1, wherein the applying an external influence step includes increasing the flow rate of the process solution.

15. The method of claim 1, wherein the thickness of the passivation layer is allowed to increase in thickness for a period of 3-10 seconds.

16. The method of claim 1, wherein the thickness of the passivation layer is reduced from a period of 2-5 seconds.

17. The method of claim 1, wherein the passivation layer increases in thickness during electropolishing.

18. The method of claim 17, further comprising stopping electropolishing before reducing the thickness of the passivation layer.

19. A method of removing material from a conductive surface of a workpiece while the conductive surface and an electrode are wetted by a process solution, the method comprising:
    forming a layer on the conductive surface by applying a first power between the conductive surface and the electrode, wherein forming comprises transforming a portion of the conductive surface; and
    removing the layer on the conductive surface while applying a second power, wherein the first and second powers have a same polarity.

20. The method of claim 19, wherein the step of removing comprises applying an external influence onto the conductive surface.

21. The method of claim 20, wherein applying an external influence comprises establishing a relative motion between the conductive surface and the process solution.

22. The method of claim 21, wherein the conductive surface is spun in the process solution.

23. The method of claim 20, wherein the step of applying an external influence includes reducing a local current density at a local region of the layer on the conductive surface.

24. The method of claim 23, wherein the step of reducing a local current density includes physically sweeping the layer on the conductive surface to reduce the local current density.

25. The method of claim 19, wherein the first power is applied for a predetermined time.

26. The method of claim 19, wherein the second power is applied for a predetermined time.

27. The method of claim 19, wherein the first power comprises an electropolishing voltage.

28. The method of claim 19, wherein the second power comprises zero voltage.

29. The method of claim 19, wherein the second power comprises negative voltage.

30. The method of claim 19, wherein the first power and the second power comprise a pulsed wave form.

31. The method of claim 19, wherein the applying an external influence step includes increasing local temperature of the process solution over the conductive surface.

32. The method of claim 19, wherein the applying an external influence step includes increasing the flow rate of the process solution.

33. A method of removing material from a conductive surface of a workpiece in a process solution, the method comprising:
    forming a layer on the conductive surface by applying a first power between the conductive surface and an electrode while the conductive surface and the electrode are wetted by the process solution, wherein forming comprises transforming a portion of the conductive surface; and
    removing the layer on the conductive surface while applying zero voltage and applying an external influence onto the conductive surface, wherein applying the external influence is performed by spinning the conductive surface outside the process solution.

* * * * *